(12) United States Patent
Sakamoto et al.

(10) Patent No.: US 10,070,445 B2
(45) Date of Patent: Sep. 4, 2018

(54) ACCESS POINT, WIRELESS COMMUNICATION METHOD, AND PROGRAM

(71) Applicant: NEC CORPORATION, Tokyo (JP)

(72) Inventors: Kazuyuki Sakamoto, Tokyo (JP); Masao Saito, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 213 days.

(21) Appl. No.: 14/906,435

(22) PCT Filed: Jul. 18, 2014

(86) PCT No.: PCT/JP2014/069149
§ 371 (c)(1),
(2) Date: Jan. 20, 2016

(87) PCT Pub. No.: WO2015/012208
PCT Pub. Date: Jan. 29, 2015

(65) Prior Publication Data
US 2016/0165617 A1 Jun. 9, 2016

(30) Foreign Application Priority Data

Jul. 22, 2013 (JP) .................................. 2013-151834

(51) Int. Cl.
*H04W 72/08* (2009.01)
*H04W 72/04* (2009.01)
(Continued)

(52) U.S. Cl.
CPC ......... *H04W 72/082* (2013.01); *H04W 16/14* (2013.01); *H04W 72/048* (2013.01); *H04W 84/12* (2013.01); *H04W 92/20* (2013.01)

(58) Field of Classification Search
None
See application file for complete search history.

(56) References Cited

U.S. PATENT DOCUMENTS

2005/0206554 A1 9/2005 Yamaura
2006/0082489 A1 4/2006 Liu et al.
(Continued)

FOREIGN PATENT DOCUMENTS

CN 101884194 A 11/2010
CN 101895903 A 11/2010
(Continued)

OTHER PUBLICATIONS

Zhou Lan et al., "Synchronization of Quiet Periods for Incumbent User Detection," IEEE 802.11-10/0256r0, Mar. 2010, URL <https://mentor.ieee.org/802.11/dcn/10/11-10-0256-01-00af-modification-on-dfs-and-dcf-procedure-adapting-to-fcc-rrule-in-tvws-part-1-synchronized-quiet.ppt>, 14 pages.
(Continued)

*Primary Examiner* — Kevin C Harper
*Assistant Examiner* — Derrick V Rose
(74) *Attorney, Agent, or Firm* — Sughrue Mion, PLLC (57) ABSTRACT

An access point includes: detection means detecting radar signal; detection notification means notifying other access point of radar signal detection; assessment means assessing whether to own authority to determine channel used among access points; determination means determining channel used among access points when detection means detects radar signal or when other access point notifies of radar signal detection, when owning authority; channel notification means notifying other access point of the channel determined by determination means; and change means changing the channel used between other access point to either the channel determined by determination means or to a channel notified from other access point. When a plurality of access points detect radar signal, entire system is operable through new channel.

13 Claims, 4 Drawing Sheets

(51) Int. Cl.
   *H04W 16/14*   (2009.01)
   *H04W 92/20*   (2009.01)
   *H04W 84/12*   (2009.01)

(56)            References Cited

U.S. PATENT DOCUMENTS

| | | | |
|---|---|---|---|
| 2009/0052382 A1 | 2/2009 | Stephenson et al. | |
| 2009/0146866 A1 | 6/2009 | Matsumoto et al. | |
| 2010/0302966 A1 | 12/2010 | Matsuura | |
| 2013/0194944 A1* | 8/2013 | Soyak | H04W 16/14 370/252 |

FOREIGN PATENT DOCUMENTS

| | | |
|---|---|---|
| JP | 2005-223865 A | 8/2005 |
| JP | 2009-141588 A | 6/2009 |
| JP | 2010-268380 A | 11/2010 |
| JP | 2012-195786 A | 10/2012 |
| JP | 2012248939 A | 12/2012 |
| JP | 2013-059008 A | 3/2013 |
| WO | 2007100323 A1 | 9/2007 |

OTHER PUBLICATIONS

Written Opinion of International Searching Authority of PCT/JP2014/069149 dated Sep. 30, 2014.

International Search Report of PCT/JP2014/069149 dated Sep. 30, 2014.

Extended European Search Report dated Feb. 1, 2017, issued by the European Patent Office in corresponding application No. 14829770.8.

Communication dated Feb. 8, 2017, issued by the Intellectual Property Office of Taiwan in corresponding application No. 103124807.

Communication dated Oct. 31, 2017, issued by the Japan Patent Office in corresponding Japanese Application No. 2012-528263.

\* cited by examiner

ACCESS POINT, WIRELESS COMMUNICATION METHOD, AND PROGRAM

CROSS REFERENCE TO RELATED APPLICATIONS

This is a National Stage of International Application No. PCT/JP2014/069149 filed Jul. 18, 2014, claiming priority based on Japanese Patent Application No. 2013-151834 filed Jul. 22, 2013, the contents of all of which are incorporated herein by reference in their entirety.

TECHNICAL FIELD

Description of Related Application

The present invention is based upon Japanese Patent Application No. 2013-151834 (filed on Jul. 22, 2013), the contents of which are incorporated herein by reference in their entirety.

The present invention relates to an access point, a wireless communication method, and a program and relates particularly to a wireless local area network (LAN) access point, a wireless communication method, and a program that prevent interference with a weather radar.

Background Art

Many existing public wireless LAN access points use a cable (a LAN cable, for example) as a backhaul line that connects a broadband line and a wireless access line. This requires to lay extra LAN cables, causing disadvantages in terms of external appearance, construction costs, labor costs, and the like. To reduce such disadvantages, access points using a wireless backhaul line have been developed.

However, an access point employing a wireless backhaul line is unable to be used outside. This is because there is no fully developed technique capable of preventing conflict between a wireless backhaul line and a weather radar signal when the access point uses the 5.6 GHz band (which is the only band usable outside in a 5-GHz-band wireless LAN). In the current state, it is not possible to use the wireless backhaul function outside without using the dynamic frequency selection (DFS) function, which is capable of preventing conflict with a weather radar signal, for a configuration using a wireless backhaul line.

As a related art, PTL 1 describes a wireless communication system including: an interference detection means that detects a radar signal; a channel change means that determines a new channel when the DFS is started; and a new-channel notification means that notifies a different access point of the new channel.

CITATION LIST

Patent Literature

PTL 1: Japanese Laid-open Patent Publication No. 2010-268380

Technical Problem

The contents disclosed in PTL 1 described above are incorporated herein by reference in their entirety. The following analysis is made by the inventor of the present invention.

According to the Radio Law, access points using the 5.3 GHz band or the 5.6 GHz band among existing public wireless LAN access points need to have a function of preventing conflict with a weather radar signal (hereinafter, referred to as "DFS").

However, when a wireless backhaul line is used, the wireless channel of all the related access points needs to be changed upon receipt of a weather radar signal. At present, there is no fully developed technique for changing the channel in such a case.

For example, it is assumed that only one of two access points detects a radar signal in the system described in PTL 1. Specifically, it is assumed that an access point that has detected a radar signal starts a DFS process including change of the channel and the other access point operates by following the operation of the former access point. For this reason, the system described in PTL 1 is not capable of determining as to which access point to take the lead in the changing the channel and which access point to operate by following the operation of the leading access point, when multiple access points detect a radar signal. This may cause a problem of not being able to appropriately prevent interference with the radar signal.

In view of these circumstances, it is desired that the entire wireless communication system is able to operate by using a new channel when multiple access points detect a radar signal. The present invention aims to provide an access point, a wireless communication method, and a program that contribute to the above desire.

Solution to Problem

An access point according to a first aspect of the present invention includes:

detection means detecting a radar signal;

detection notification means notifying a different access point that the radar signal is detected;

assessment means assessing whether or not the access point has authority to determine a channel to be used between the access points;

determination means determining, when the access point has the authority, the channel to be used between the access points upon detection of a radar signal by the detection means or upon detection notification of a radar signal from the different access point;

channel notification means notifying the different access point of the channel determined by the determination means; and change means changing a channel used with the different access point, to the channel determined by the determination means or the channel notified from the different access point.

A wireless communication method according to a second aspect of the present invention includes:

a step of an access point detecting a radar signal;

a step of notifying a different access point that the radar signal is detected;

a step of assessing whether or not the access point has authority to determine a channel to be used between the access points;

a step of determining, when the access point has the authority, the channel to be used between the access points upon detection of a radar signal or upon detection notification of a radar signal from the different access point;

a step of notifying the different access point of the determined channel; and a step of changing a channel used with the different access point to the determined channel or a channel notified from the different access point.

A program according to a third aspect of the present invention causes a computer installed at an access point to perform:

a process of detecting a radar signal;

a process of notifying a different access point that the radar signal is detected;

a process of assessing whether or not the access point has authority to determine a channel to be used between the access points;

a process of determining, when the access point has the authority, the channel to be used between the access points upon detection of a radar signal or upon detection notification of a radar signal from the different access point;

a process of notifying the different access point of the determined channel; and a process of changing a channel used with the different access point to the determined channel or a channel notified from the different access point.

The program may be provided as a program product stored in a non-transitory computer-readable storage medium.

Advantageous Effects of Invention

According to the access point, the wireless communication method, and the program of the present invention, the entire wireless communication system can operate by using a new channel when multiple access points detect a radar signal.

DESCRIPTION OF EMBODIMENTS

Exemplary Embodiment 1

An access point according to a first exemplary embodiment is described in detail with reference to the drawings. The access point according to this exemplary embodiment is a public wireless local area network (LAN) access point and is capable of preventing conflict with a weather radar while maintaining a connected state using a backhaul line even if the conflict occurs when the backhaul line connecting a broadband line and a wireless access line is wirelessly configured.

Figure 1:
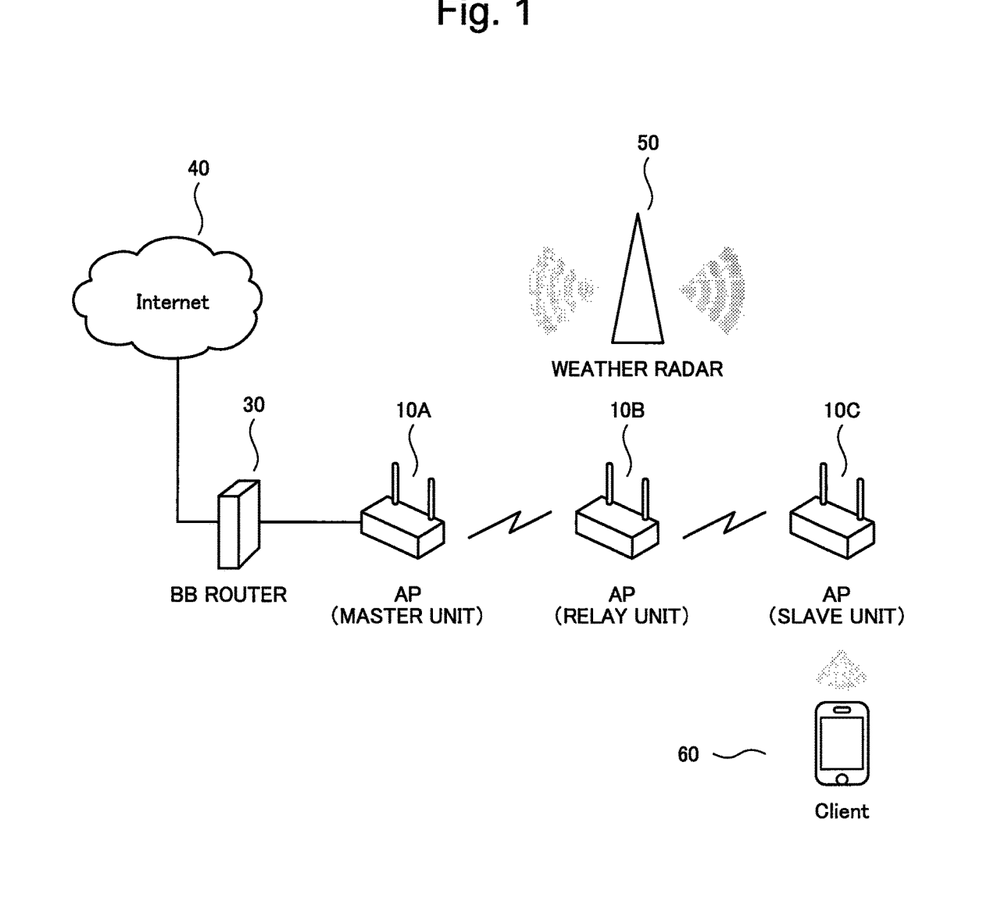
FIG. 1 is a diagram illustrating an example of a configuration of a wireless communication system including access points according to a first exemplary embodiment.

FIG. 1 is a diagram illustrating an example of a device configuration when a backhaul line of access points 10A to 10C according to this exemplary embodiment is wirelessly configured. FIG. 1 illustrates a device configuration in which the multiple access points 10A to 10C relay a signal through a single broadband (BB) line. When one or more of the access points 10A to 10C detect interference with a radio wave from a weather radar 50, all the access points 10A to 10C recover the previous signal relay configuration using a new channel.

With reference to FIG. 1, there is the single access point 10A which is connected, via a cable, to a BB (broadband) router 30 connected to the Internet 40. This access point 10A is called a master unit hereinafter. Under the control of the master unit 10A, there is the single access point 10B, which is wirelessly connected to the master unit 10A. This access point 10B is called a relay unit hereinafter. The relay unit 10B transmits and relays a signal wirelessly received from the master unit 10A to still another access point. Here, there is also the access point 10C, which receives the signal wirelessly transmitted by the relay unit 20B. This access point 10C is called a slave unit hereinafter.

FIG. 1 illustrates a configuration of a set of a wireless LAN access point system including the host unit 10A, the relay unit 10B, and the slave unit 10C to have a relay function. In other words, each of the host unit 10A, the relay unit 10B, and the slave unit 10C transmits and receives a signal through the BB line.

It is possible for a client 60 to use the wireless LAN system in wide area by selecting one of the access points 10A to 10C and communicating within the area covered by the access point.

Meanwhile, the weather radar 50 transmits a radar signal having a certain frequency. When the signal from the weather radar 50 and a signal from the wireless LAN interfere with each other, a higher priority is given to the signal from the weather radar 50. For this reason, the units forming the wireless LAN system need to temporarily stop the transmission of the radio wave. Therefore, the units need to change the transmission channel and transmit the radio wave through the new transmission channel.

Figure 2:
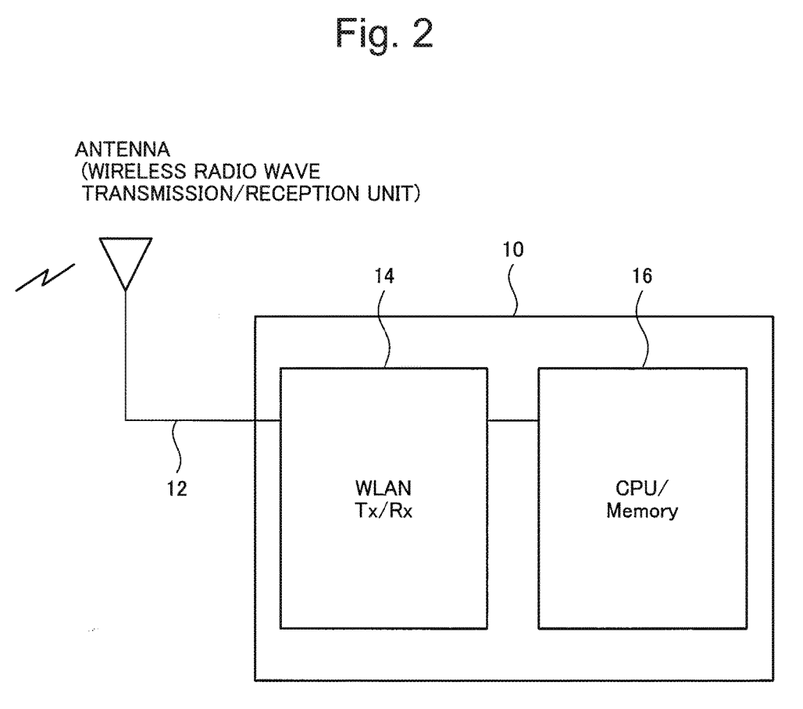
FIG. 2 is a block diagram illustrating an example of a schematic configuration of an access point according to the first exemplary embodiment.

FIG. 2 is a block diagram illustrating an example of a schematic configuration of an access point 10. The access point 10 transmits and receives a radio wave via an antenna 12. Further, the access point 10 includes a Tx/Rx unit 14 receiving a radio wave from the antenna 12 and transmitting a radio wave to the antenna 12, and a central processing unit (CPU)/memory unit 16 performing processes such as signal processing and storing processing.

Figure 3:
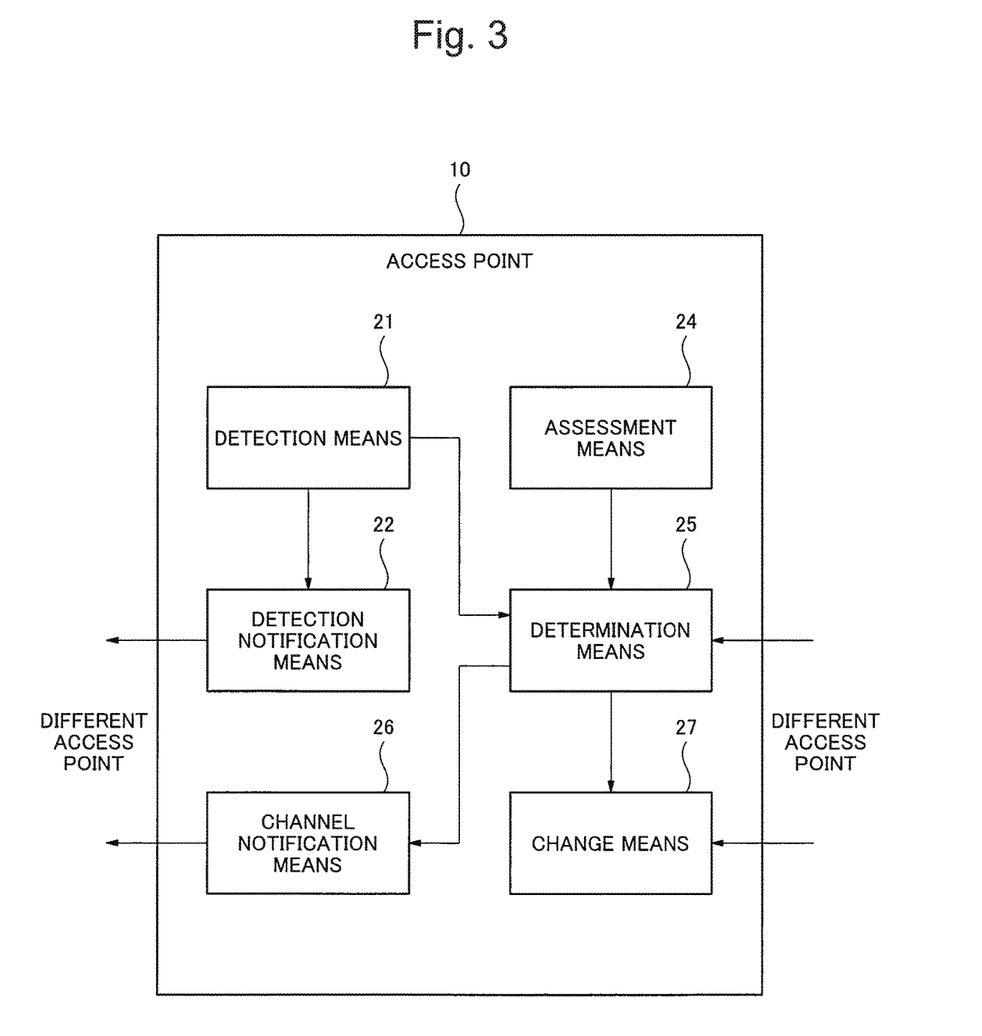
FIG. 3 is a block diagram illustrating an example of a configuration of the access point according to the first exemplary embodiment.

FIG. 3 is a block diagram illustrating an example of a detailed configuration of the access point 10 according to this exemplary embodiment. With reference to FIG. 3, the access point 10 includes a detection means (or detection unit) 21, a detection notification means (or detection notification unit) 22, an assessment means (or assessment unit) 24, a determination means (or determination unit) 25, a channel notification means (or channel notification unit) 26, and a change means (or change unit) 27.

The detection means 21, the detection notification means 22, the assessment means 24, the determination means 25, the channel notification means 26, and the change means 27 may be implemented in the CPU/memory unit 16 in FIG. 2. For example, each of the above means may be implemented by the CPU of the CPU/memory unit 16 reading a program stored in the memory of the CPU/memory unit 16 and executing the program.

The detection means 21 detects a radar signal. The detection notification means 22 notifies a different access point that the detection means 21 has detected a radar signal.

The assessment means 24 assesses whether or not the access point 10 has authority to determine a channel to be used between the access points. When the detection means 21 detects a radar signal and the different access point does not notify detection of a radar signal, the assessment means 24 may assess that the access point 10 has authority to determine the channel. Alternatively, when the detection means 21 detects a radar signal and the different access point notifies detection of a radar signal, the assessment means 24 may assess whether or not the access point 10 has authority to determine the channel, on the basis of the identifier assigned to the access point 10 itself and the identifier assigned to the different access point (i.e., the access point that has notified the detection of the radar signal). The assessment means 24 may assess whether or not the access point 10 has authority to determine the channel, on the basis of the magnitude relationship between the basic service set identifiers (BSSID) or identifiers of the media access control (MAC) addresses, for example. Note that a method used by the assessment means 24 to assess whether or not the access point 10 has authority to determine the channel is not limited to any of the above.

When the access point 10 has authority to determine the channel to be used between the access points, the determination means 25 determines the channel to be used between the access point upon detection of a radar signal by the detection means 21 or notification of detecting a radar signal by the different access point. The determination means 25 may obtain the occupancy of each of multiple channels and determine, from among the multiple channels, the channel that does not interfere with the radar signal and has low occupancy to be the channel to be used between the access points. Note that a method used by the determination means 25 to determine the channel is not limited to this.

The channel notification means 26 notifies the different access point of the channel determined by the determination means 25. The change means 27 changes the channel used with the different access point, to the channel determined by the determination means 25 or a channel notified by the different access point.

Figure 4:
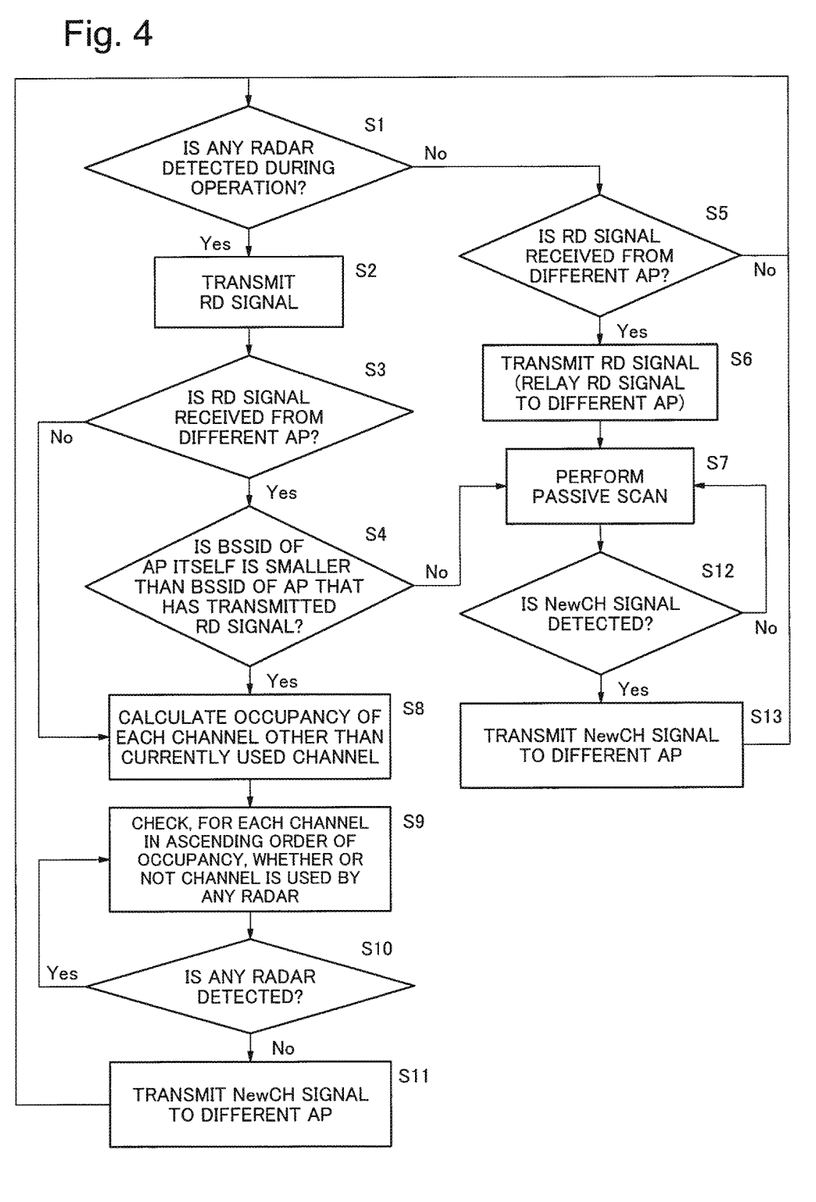
FIG. 4 is a flowchart illustrating an example of operation of the access point according to the first exemplary embodiment.

FIG. 4 is a flowchart illustrating an example of operation for preventing conflict with the weather radar 50 while maintaining a connected state using the backhaul line, when at least one of the access points 10A to 10C in the configuration illustrated in FIG. 1 detects interference with a radio wave from the weather radar 50. Specifically, FIG. 4 illustrates operation of each of the access points 10A to 10C in a process from when at least one of the access points 10A to 10C detects the weather radar 50 to when all the access points 10A to 10C change the channel and restore the relay function.

In this exemplary embodiment, each access point related to the relay function is categorized on the basis of whether or not the access point itself detects interference with a weather radar signal, not on the basis of the distinction among master unit, relay unit, or slave unit of the access point. Here, the condition for detecting interference with a weather radar signal is that the channel (frequency) of the weather radar signal and the channel used by the access point are the same. The DFS start condition for a single access point defined according to the Radio Law is applied to the respects other than the above.

With reference to FIG. 4, when none of the access points 10A to 10C detects a signal from the weather radar 50 during operation (No in Step S1 and No in Step S5), the access points 10A to 10C continue the operation based on the relay function.

In contrast, when at least one of the access points 10A to 10C detects a signal from the weather radar during operation, the access point stops the transmission of a radio wave through the currently used channel within a certain time period according to the DFS start condition.

When the access point is in operation independently, the access point simply needs to stop the transmission of a radio wave. However, when the relay function is implemented by the access points 10A to 10C as in this exemplary embodiment, if one of the access points individually changes the used channel, it may prevent the other access points from finding the new channel. Consequently, it may cause a problem of not successfully restoring the relay function. To address this problem, the access point that has detected interference with a radio wave from the weather radar notifies the other access points of the detection, and one of the access points changes the channel and then notifies the other access points of the new channel.

With reference to FIG. 4, when the detection means 21 of one of the access points receives interference radio wave from the weather radar 50 (Yes in Step S1), the detection notification means 22 of the access point transmits, to the access points corresponding to the direct relay destination(s) (both host and subordinate units), a signal notifying that the access point has received an interference radio wave from the weather radar 50 (i.e., a signal notifying the other access points that the use of the currently used channel is prohibited, the signal being referred to as an "RD signal" hereinafter) (Step S2). The access point thereafter stops the transmission of a radio wave via the currently used channel according to the DFS start condition.

When the number of access points that have received an interference radio wave from the weather radar 50 is only one, the access point does not receive any RD signal from the other access points (No in Step S3). In this case, the assessment means 24 of the access point assesses that the access point has authority to select the channel to be used next. An access point that has authority to determine a channel to be used next as described above is referred to as a "master access point (AP)".

In contrast, when the detection notification means 22 transmits an RD signal (Step S2) and the access point receives an RD signal from any of the other access points (Yes in Step S3), this means that multiple access points have received the interference radio wave from the weather radar 50 at the same time. In this case, when each of the multiple access points individually determine the next channel, the access points may determine different channels as the next channel, consequently preventing restoration of the relay function. To avoid such a situation, only one access point can be a master AP, and hence a single master AP needs to be determined from among the multiple access points. In this case, the assessment means 24 determines, on the basis of the number which is unique to service set identifiers (SSIDs) used for the relay function and is called basic service set identifier (BSSID), the access point having the smallest BSSID value as a master AP (Yes in Step S4). Here, the access points that are not determined as a master AP (No in Step S4) wait for the master AP to determine the next channel (perform passive scan) (Step S7). Each access point not having authority to determine the channel to be used next is referred to as a "slave AP" hereinafter.

As described above, the distinction between master AP and slave AP do not depend on the distinction among master unit, relay unit, and slave unit, of the relay function.

In contrast, when an access point that has not received by itself any interference radio wave from the weather radar receives an RD signal from a host access point or a subordinate access point (No in Step S1 and Yes in Step S5), the access point is automatically determined to be a slave AP. The AP determined to be a slave AP transfers the received RD signal to the other access point(s) (all the host and subordinate units) (Step S6). The slave AP, although not detecting any interference radio wave from the weather radar 50 by itself, thereafter stops the transmission of a radio wave through the currently used channel by applying the DFS start condition.

Through the above-described operation, all the access points 10A to 10C using the relay function stop the transmission of a radio wave through the currently used channel within the certain time period after the detection of the interference radio wave from the weather radar 50.

Subsequently, the determination means 25 of the master AP determines a channel to be used next. Candidates of the channel to be used are those that are at any of 5.2 GHz, 5.3 GHz, and 5.6 GHz for indoor use (any of 5.6 GHz for outdoor use) and that have not received any interference radio wave within the past thirty minutes including the same channel as that used by the weather radar (according to the Radio Law). Here, even when the access points individually set candidate channels, the above condition needs to be complied with.

The determination means 25 of the master AP receives radio waves through the respective channels satisfying the above condition among the candidate channels and calculates the occupancy of each of the channels (Step S8). Upon completion of receiving the radio waves of all the channels and calculating the occupancies, a candidate channel list in which the candidate channels are sorted in ascending order of occupancy is generated in the access point. The determination means 25 determines the first channel in the candidate channel list (i.e., the channel having the lowest occupancy) as the preliminary channel to be used next.

After determining the candidate channel as the preliminary channel to be used, the determination means 25 receives a radio wave of the preliminarily determined channel for at least one minute according to the DFS start condition, in order to check whether no interference radio wave is received from a different weather radar (Step S9). When an interference radio wave from a different weather radar is received (Yes in Step S10), the preliminarily determined channel is also unusable. Hence, the determination means 25 receives again a radio wave through the second channel in the candidate channel list for at least one minute to check whether no interference radio wave from a weather radar is received (Step S9).

When no interference radio wave has been received for one minute from a different weather radar (No in Step S10), the determination means 25 officially determines the channel as the channel to be used next. This determination allows transmission of a radio wave through the new channel. Now, the change means 27 of the master AP starts the transmission of a radio wave through the new channel. Further, the notification means 26 of the master AP transmits, to each access point corresponding to a direct relay destination (both host and subordinate units), a signal notifying that the new channel is determined and transmission of a radio wave through the new channel is permitted (referred to as a "NewCH signal" hereinafter) (Step S11).

Meanwhile, each of all the slave APs stop the transmission of a radio wave until the slave AP receives a NewCH signal from the master AP or the other slave AP (No in Step S12, and Step S7). After the slave AP receives a NewCH signal from the master AP or the other slave AP (Yes in Step S12), the change means 27 of the slave AP starts transmission of a radio wave through the new channel. Further, the channel notification means 26 of the slave AP then transmits a NewCH signal to the other access point(s) (both the host and subordinate units) (Step S13).

Through the above algorithm, all the access points 10A to 10C having the relay function can restore the relay function using the new channel.

Here, since the master AP takes one minute or longer to check on reception of a radio wave (Step S10), each slave AP also stops the radio wave for one minute or longer, hence respecting the DFS start condition.

In this exemplary embodiment, when the wireless channel needs to be changed for multiple access points at the same time, the multiple access points are distinguished between an access point to serve as a master (i.e., an access point that is to actually change the wireless channel) and access points to serve as slaves (access points that are to follow the change of the channel by the master). Consequently, even in a configuration where a backhaul line is configured wirelessly, it is possible to prevent conflict between the backhaul line and the weather radar signal while maintaining a connected state using the backhaul line when a weather radar signal is received.

In other words, according to the access point of this exemplary embodiment, it is possible to prevent interference with a radio wave from a weather radar and also maintain the connection of the access points through the backhaul line when the backhaul line of wireless LAN access points is wirelessly configured.

Moreover, according to the access point of this exemplary embodiment, it is possible to shorten the time period in which the access point is unusable due to interference with a radio wave from the weather radar, consequently increasing the time period in which service can be provided to end users.

Furthermore, according to the access point of this exemplary embodiment, the access point serving as a slave (slave AP) does not experience a state of being unusable due to interference with a radio wave from the weather radar 50. This eliminates the necessity of restoring the function of the access point by operation at the access point or remote operation, consequently reducing the number of management steps.

Modified Example

Various modifications can be made to the access point according to the above-described exemplary embodiment.

The location at which an access point is installed may be indoor or outdoor. Further, multiple access points may be installed both across indoor and outdoor. Nevertheless, when at least one access point is installed outside, the entire relay function is considered to be for outdoor use. This is because, as described above, only 5.6 GHz is usable for outdoor use, whereas any of 5.2 GHz, 5.3 GHz, and 5.6 GHz is usable for indoor use.

The destination to which the master unit 10A of an access point is connected via a cable does not need to be the Internet connection. The relay function can be implemented and hence the present invention is applicable even in the case of a stand-alone configuration where a computer or the like having a data server function, such as a file transfer protocol (FTP), is connected to the master unit 10A.

Note that the present invention is not applicable to access points that can only use 2.4 GHz or 5.2 GHz. This is because no weather radar uses these frequencies in any case. However, when at least one access point that can use 5.3 GHz or 5.6 GHz is installed, the present invention is applicable.

Access points included in a configuration of implementing the relay function may have any configuration without being limited to those described in the above exemplary embodiment. This is with respect to, for example, the number of access points to be included, the number of levels in the relay hierarchy (referred to as the "number of hops" hereinafter), the distance of each relay section, the number of access points related to each hierarchy level.

Further, access points included in a configuration implementing the relay function may have multiple manufacturing vendors, multiple models, multiple hardware versions, or multiple software versions. Nevertheless, the specifications related to the relay function including the operation according to the present invention are preferably unified at the time when the relay function is implemented.

In the above-described exemplary embodiment, it is assumed that each access point is operable independently (referred to as an "autonomous AP" hereinafter). However, the present invention is similarly applicable to a system including an apparatus capable of controlling operation of each access point (AP controller). In this case, an apparatus that determines a channel to be used next after detecting interference radio wave may be any of a master AP and an AP controller (also referred to as a network management system (NMS)). Note, however, that even when an AP controller determines a new channel, a NewCH signal is preferably transmitted by a master AP.

Instead of determining the access point having the smallest BSSID value to be a master AP that determines a channel to be used next as in the above-described exemplary embodiment, the access point having the largest BSSID value may be determined to be a master AP. Alternatively, the access point having the numerically smallest or largest media access control (MAC) address of the device may be determined to be a master AP. In addition to the above, it may not be considered whether an access point has actually received an interference radio wave. For example, a master unit may be determined to be a master AP all the time. In this case, after the relay function of all the access points is stopped, the master unit searches for channels, and consequently determines a new channel and transmits a NewCH signal.

Regarding access points that can use both of the frequencies of 2.4 GHz and 5 GHz at the same time, it is not considered whether or not to stop a Wi-Fi radio wave for services at 2.4 GHz or the like during the period in which the relay function is stopped. However, since the units other than the master unit is not capable of being actually connected to the Internet or a local server, the terminals associated with (located in the area covered by) a relay unit or a slave unit is not possible to maintain the previous state in any case.

Examples of a method of determining a relay configuration (a master-slave relationship, for example) are a method of manually setting a relay configuration at each access point, a method of manually setting a relay configuration at all access points together by an AP controller or the like, and a method of automatically setting a relay configuration on the basis of a radio environment or the like. The present invention may employ any of the methods for determining a relay configuration.

Further, the present invention is applicable to a case of using different channels in the uplink and downlink of the relay line. For example, when only an uplink detects an interference radio wave, it is preferable to change only the channel of the uplink. In contrast, when only a downlink detects an interference radio wave, it is preferable to change only the channel of the downlink.

When only one channel is usable, the relay line is stopped for 30 minutes. This is because it is not allowed, according to the DFS start condition, to use a channel that has detected an interference radio wave from a weather radar, for the next 30 minutes. Here, when there are multiple usable channels but the use of all the channels are prohibited, the transmission of a radio wave is stopped until one or more channels become usable. Accordingly, at the time when one or more channels become usable, the relay line is established through one of the usable channels.

In the above described embodiment, the method of determining a new channel by a master AP is based on the ascending order of occupancy. However, any other determination method may be employed as long as the method satisfies the channel use condition and conforms to the DFS start condition. For example, a channel may be determined in the ascending order of channel number, the descending order of channel number, or ascending order of the number of detected access points.

The following modes are possible according to the present invention.

[Mode 1]
An access point corresponding to the access point according to the first aspect described above.

[Mode 2]
The access point according to Mode 1, wherein the assessment means assesses that the access point has the authority when the detection means detects a radar signal and the different access point does not notify the access point of detecting a radar signal.

[Mode 3]
The access point according to Mode 1 or 2, wherein, when the detection means detects a radar signal and the different access point notifies the access point of detecting a radar signal, the assessment means assesses whether or not the access point has the authority based on an identifier assigned to the access point and an identifier assigned to the different access point.

[Mode 4]
The access point according to Mode 3, wherein the assessment means assesses whether or not the access point has the authority based on a magnitude relationship between a basic service set identifier (BSSID) or a media access control (MAC) address assigned to the access point and a BSSID or a MAC address assigned to the different access point.

[Mode 5]
The access point according to any one of Modes 1 to 4, wherein the determination means obtains occupancy of each of a plurality of channels, and determines a channel that does not interfere with any radar signal while having smaller occupancy from among the plurality of channels, to be the channel to be used between the access points.

[Mode 6]
A wireless communication system including a plurality of access points each corresponding to the access point according to any one of Modes 1 to 5.

[Mode 7]
A wireless communication method corresponding to the wireless communication method according to the second aspect described above.

[Mode 8]
The wireless communication method according to Mode 7, wherein the access point assesses that the access point has the authority when the access point detects a radar signal and the different access point does not notify the access point of detecting a radar signal.

[Mode 9]

The wireless communication method according to Mode 7 or 8, wherein, when the access point detects a radar signal and the different access point notifies the access point of detecting a radar signal, the access point assesses whether or not the access point has the authority based on an identifier assigned to the access point and an identifier assigned to the different access point.

[Mode 10]

The wireless communication method according to Mode 9, wherein the access point assesses whether or not the access point has the authority based on a magnitude relationship between a basic service set identifier (BSSID) or a media access control (MAC) address assigned to the access point and a BSSID or a MAC address assigned to the different access point.

[Mode 11]

The wireless communication method according to any one of Modes 7 to 10, wherein the access point obtains occupancy of each of a plurality of channels, and determines a channel that does not interfere with any radar signal while having smaller occupancy from among the plurality of channels, to be the channel to be used between the access points.

[Mode 12]

A program corresponding to the program according to the third aspect described above.

[Mode 13]

The program according to Mode 12, wherein the program causes the computer to perform a process of assessing that the access point has the authority, when the access point detects a radar signal and the different access point does not notify the access point of detecting a radar signal.

[Mode 14]

The program according to Mode 12 or 13, wherein the program causes the computer to perform a process of, when the access point detects a radar signal and the different access point notifies the access point of detecting a radar signal, assessing whether or not the access point has the authority based on an identifier assigned to the access point and an identifier assigned to the different access point.

[Mode 15]

The program according to Mode 14, wherein the program causes the computer to perform a process of assessing whether or not the access point has the authority based on a magnitude relationship between a basic service set identifier (BSSID) or a media access control (MAC) address assigned to the access point and a BSSID or a MAC address assigned to the different access point.

[Mode 16]

The program according to any one of Modes 12 to 15, wherein the program causes the computer to perform a process of obtaining occupancy of each of a plurality of channels, and determining a channel that does not interfere with any radar signal while having smaller occupancy from among the plurality of channels, to be the channel to be used between the access points.

Note, the contents disclosed by the aforementioned patent document are incorporated herein by reference in their entirety. Changes and adjustments can be made to the exemplary embodiment within the entire disclosure (including the scope of claims) of the present invention and further on the basis of the basic technical spirit of the present invention. Further, various combinations of and selections from different disclosed components (including the components in the claims, the components in the exemplary embodiment, and the components in the drawings) are possible within the scope of the claims of the present invention. In other words, the present invention naturally includes the entire disclosure including the scope of claims as well as various changes and modifications possible to be made by those skilled in the art on the basis of the technical spirit. In particular, it is to be understood that any numerical value or small range of each numerical value range described in this description is concretely described even when no particular description is made.

REFERENCE SIGNS LIST

10 Access point
10A Access point (master unit)
10B Access point (relay unit)
10C Access point (slave unit)
12 Antenna
14 Tx/Rx unit
16 CPU/Memory unit
21 Detection means
22 Detection notification means
24 Assessment means
25 Determination means
26 Channel notification means
27 Change means
30 BB router
40 Internet
50 Weather radar
60 Client

The invention claimed is:

1. An access point which is used for a wireless backhaul line including at least three access points to connect between a broadband line and a wireless access line, said access point comprising:

a processor; and
a memory that stores program codes to be executed by the processor by causing the processor to execute:
 a detection unit that detects a radar signal;
 a detection notification unit that notifies other access points, corresponding to direct relay destinations of the wireless backhaul line, of a detection notification indicating that the radar signal is detected and of a use prohibition of a currently used channel;
 an assessment unit that assesses whether an own access point is selected as a unique master access point which has authority to determine a new channel to be used between each of the access points when detecting the radar signal and also receiving the detection notification from any of the other access points, the own access point being the access point comprising the processor and the memory;
 a determination unit that determines, when the own access point is selected as the unique master access point, a channel, that does not interfere with any radar signals while having smaller occupancy from among a plurality of channels, as the new channel to be used between each of the access points;
 a channel notification unit that notifies the other access points of a channel notification indicating that the new channel is determined and that transmission of radio waves on the new channel is permitted; and
 a change unit that changes the channel used between each of the access points to the new channel determined by the determination unit or notified by the channel notification.

2. The access point according to claim 1, wherein the assessment unit selects the own access point as the unique master access point when the detection unit detects the radar signal and the detection notification is not received from any of the other access points.

3. The access point according to claim 1, wherein, the assessment unit assesses to select the unique master access point based on an identifier assigned to the own access point and an identifier assigned to any of the other access points from which the detection notification is received.

4. The access point according to claim 3, wherein the assessment unit assesses to select the unique master access point based on a magnitude relationship between a basic service set identifier (BSSID) or a media access control (MAC) address assigned to the own access point and a BSSID or a MAC address assigned to any of the other access points from which the detection notification is received.

5. A wireless communication system which connects between a broadband line and a wireless access line as a wireless backhaul line, said system comprising at least three access points each corresponding to the access point according to claim 1.

6. A wireless communication method of an access point which is used for a wireless backhaul line including at least three access points to connect between a broadband line and a wireless access line, said method comprising:
   detecting a radar signal;
   notifying other access points, corresponding to direct relay destinations of the wireless backhaul line, of a detection notification indicating that the radar signal is detected and of a use prohibition of a currently used channel;
   assessing whether an own access point is selected as a unique master access point which has authority to determine a new channel to be used between each of the access points when detecting the radar signal and also receiving the detection notification from any of the other access points, the own access point being the access point which is used for the wireless backhaul line;
   determining, when the own access point is selected as the unique master access point, a channel, that does not interfere with any radar signals while having smaller occupancy from among a plurality of channels, as the new channel to be used between each of the access points;
   notifying the other access points of a channel notification indicating that the new channel is determined and that transmission of radio waves on the new channel is permitted; and
   changing the channel used between each of the access points to the new channel determined in the determining step or the new channel notified by the channel notification.

7. The wireless communication method according to claim 6, wherein the assessing includes selecting the own access point as the unique master access point when detecting, in the own access point, the radar signal and the detection notification is not received from any of the other access points.

8. The wireless communication method according to claim 6, wherein, the assessing includes to select the unique master access point based on an identifier assigned to own access point and an identifier assigned to any of the other access points from which the detection notification is received.

9. The wireless communication method according to claim 8, wherein the assessing includes to select the unique master access point based on a magnitude relationship between a basic service set identifier (BSSID) or a media access control (MAC) address assigned to own access point and a BSSID or a MAC address assigned to any of the other access points from which the detection notification is received.

10. A non-transitory computer-readable storage medium storing a computer program which when executed by a computer, causes the computer to execute a process of an access point which is used for a wireless backhaul line including at least three access points to connect between a broadband line and a wireless access line, said process comprising:
    a process of detecting a radar signal;
    a process of notifying other access points, corresponding to direct relay destinations of the wireless backhaul line, of a detection notification indicating that the radar signal is detected and of a use prohibition of a currently used channel;
    a process of assessing whether an own access point is selected as a unique master access point which has authority to determine a new channel to be used between each of the access points when detecting the radar signal and also receiving the detection notification from any of the other access points, the own access point being the access point which is used for the wireless backhaul line;
    a process of determining, when the own access point is selected as the unique master access point, a channel, that does not interfere with any radar signals while having smaller occupancy from among a plurality of channels, as the new channel to be used between each of the access points;
    a process of notifying the other access points of a channel notification indicating that the new channel is determined and that transmission of radio waves on the new channel is permitted; and
    a process of changing the channel used between each of the access points to the new channel determined in the determining processor the new channel notified by the channel notification.

11. The non-transitory computer-readable storage medium storing the computer program according to claim 10, wherein the assessing process includes selecting the own access point as the unique master access point when detecting, in the own access point, the radar signal and the detection notification is not received from any of the other access points.

12. The non-transitory computer-readable storage medium storing the computer program according to claim 10, wherein the assessing process includes assessing to select the unique master access point based on an identifier assigned to the own access point and an identifier assigned to any of the other access points from which the detection notification is received.

13. The non-transitory computer-readable storage medium storing the computer program according to claim 12, wherein the assessing process includes assessing to select the unique master access point based on a magnitude relationship between a basic service set identifier (BSSID) or a media access control (MAC) address assigned to the own access point and a BSSID or a MAC address assigned to any of the other access points from which the detection notification is received.

* * * * *